United States Patent
Chen et al.

(10) Patent No.: US 9,097,908 B2
(45) Date of Patent: Aug. 4, 2015

(54) REINFORCED MULTI-BODY OPTICAL DEVICES

(71) Applicant: FINISAR CORPORATION, Sunnyvale, CA (US)

(72) Inventors: Fan Chen, Shanghai (CN); Maofeng Gu, Shanghai (CN); Fahua Lan, Shanghai (CN); Huiping Li, Shanghai (CN)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/557,244

(22) Filed: Dec. 1, 2014

(65) Prior Publication Data

US 2015/0083314 A1  Mar. 26, 2015

Related U.S. Application Data

(62) Division of application No. 12/941,284, filed on Nov. 8, 2010, now Pat. No. 8,903,206.

(30) Foreign Application Priority Data

Feb. 8, 2010  (CN) .......................... 2010 1 0112234

(51) Int. Cl.
*G02B 6/28* (2006.01)
*G02B 27/28* (2006.01)
*G02B 5/12* (2006.01)
*G02B 6/293* (2006.01)

(52) U.S. Cl.
CPC ................ *G02B 27/283* (2013.01); *G02B 5/12* (2013.01); *G02B 6/29302* (2013.01); *G02B 6/29386* (2013.01)

(58) Field of Classification Search
USPC .......................................... 385/24
See application file for complete search history.

(56) References Cited

U.S. PATENT DOCUMENTS

2004/0042708 A1 *  3/2004  Koh et al. ....................... 385/16

* cited by examiner

*Primary Examiner* — Uyen Chau N Le
*Assistant Examiner* — Hoang Tran
(74) *Attorney, Agent, or Firm* — Maschoff Brennan

(57) ABSTRACT

Disclosed in one example embodiment is a method for fabricating a reinforced multi-body optical device. One method involves applying a coating to sides of an interior plate and bonding two plates to either side of the interior plate. The bonded plates are diced at an angle that is not orthogonal to the bonded plates. The top and bottom portions of a diced section are removed to form a multi-body polarization beam splitter (PBS) having a generally rectangular perimeter. A supporting plate is bonded to the multi-body PBS to form a reinforced multi-body PBS, wherein the supporting plate has a CTE that is within about 0.5 parts per million of the CTE of the multi-body PBS. The multi-body PBS is grinded to reduce the thickness of the multi-body PBS.

6 Claims, 14 Drawing Sheets

| Optical Device | PBS Thickness (mm) | Gap Thickness (mm) | Retro Reflector Thickness (mm) | Overall Thickness (mm) | Insertion Loss (dB) | Extinct Ratio (dB) | Yield |
|---|---|---|---|---|---|---|---|
| Prior Art PBD | 1 | 2 | 3 | 6 | 0.1 | 35 | 20% |
| PBD 250 | 1 | 0 | 3 | 4 | 0.05 | 35 | 90% |

REINFORCED MULTI-BODY OPTICAL DEVICES

CROSS-REFERENCES AND RELATED APPLICATIONS

This application is a divisional of U.S. patent application Ser. No. 12/941,284 filed Nov. 8, 2010, titled REINFORCED MULTI-BODY OPTICAL DEVICES, which claims the benefit of Chinese Patent Application for Invention No. 201010112234.7, filed on Feb. 8, 2010, both of which are hereby incorporated by reference in their entireties.

BACKGROUND

An optical interleaver is a passive fiber-optic device that is used to interleave two sets of dense wavelength-division multiplexing (DWDM) channels (odd and even channels) into a composite signal stream. For example, an optical interleaver can be configured to receive two multiplexed signals with 100 GHz spacing and interleave them to create a denser DWDM signal with channels spaced 50 GHz apart. An optical interleaver can also function as a deinterleaver by reversing the direction of the signal stream passing through the interleaver.

Optical interleavers have been widely used in DWDM systems and have become an important building block for optical networks with high-data-rate transmission. Optical interleavers are easier to manufacture in some respects compared to other bandpass filtering technologies, such as thin-film filters and arrayed waveguided gratings. However, with the increased demand for smaller and smaller optical interleavers, attempts have been made to also reduce the size of the internal components of the optical interleavers. However, as the sizes of the internal optical components are reduced, the process complexity of the fabrication of the internal components increases and the yield of internal components decreases.

BRIEF SUMMARY OF SOME EXAMPLE EMBODIMENTS

In general, example embodiments of the invention relate to reinforced multi-body optical devices. At least some example embodiments enhance the strength of a multi-body optical device which enables the manufacture of a thinner multi-body optical device. The example embodiments disclosed herein also improve the long-term stability and reliability of these thinner multi-body optical device, even in harsh application environments.

In one example embodiment, a method for fabricating a reinforced multi-body optical device includes various acts. First, a supporting plate is bonded, using pressure and heat, to a multi-body optical device to form a reinforced multi-body optical device. The supporting plate has a coefficient of thermal expansion (CTE) that is within about 0.5 parts per million of the CTE of the multi-body optical device. Then, the multi-body optical device is ground to reduce the thickness of the multi-body optical device.

In another example embodiment, a method for fabricating a reinforced multi-body polarization beam splitter (PBS) includes various acts. First, a PBS coating is applied to either side of an interior plate. Next, two plates are bonded, using heat and pressure, to either side of the interior plate. Then, the bonded plates are diced at an angle that is not orthogonal to the bonded plates. Next, the top and bottom portions of a diced section are removed to complete the formation of a multi-body PBS having a generally rectangular perimeter. Then, a supporting plate is bonded, using heat and pressure, to the multi-body PBS to form a reinforced multi-body PBS. The supporting plate has a CTE that is within about 0.5 parts per million of the CTE of the multi-body PBS. Finally, the multi-body PBS is ground to reduce the thickness of the multi-body PBS.

In yet another example embodiment, a reinforced multi-body optical device includes a multi-body optical device a supporting plate bonded without epoxy to the multi-body optical device. The multi-body optical device has a thickness that is less than or equal to about 1.0 millimeters. The supporting plate has a CTE that is within about 0.5 parts per million of the CTE of the multi-body optical device.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments of the present invention relate to reinforced optical devices. At least some example embodiments enhance the strength of an optical device which enables the manufacture of a thinner multi-body optical device. The example embodiments disclosed herein also improve the long-term stability and reliability of these thinner multi-body optical device, even in harsh application environments.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1A:
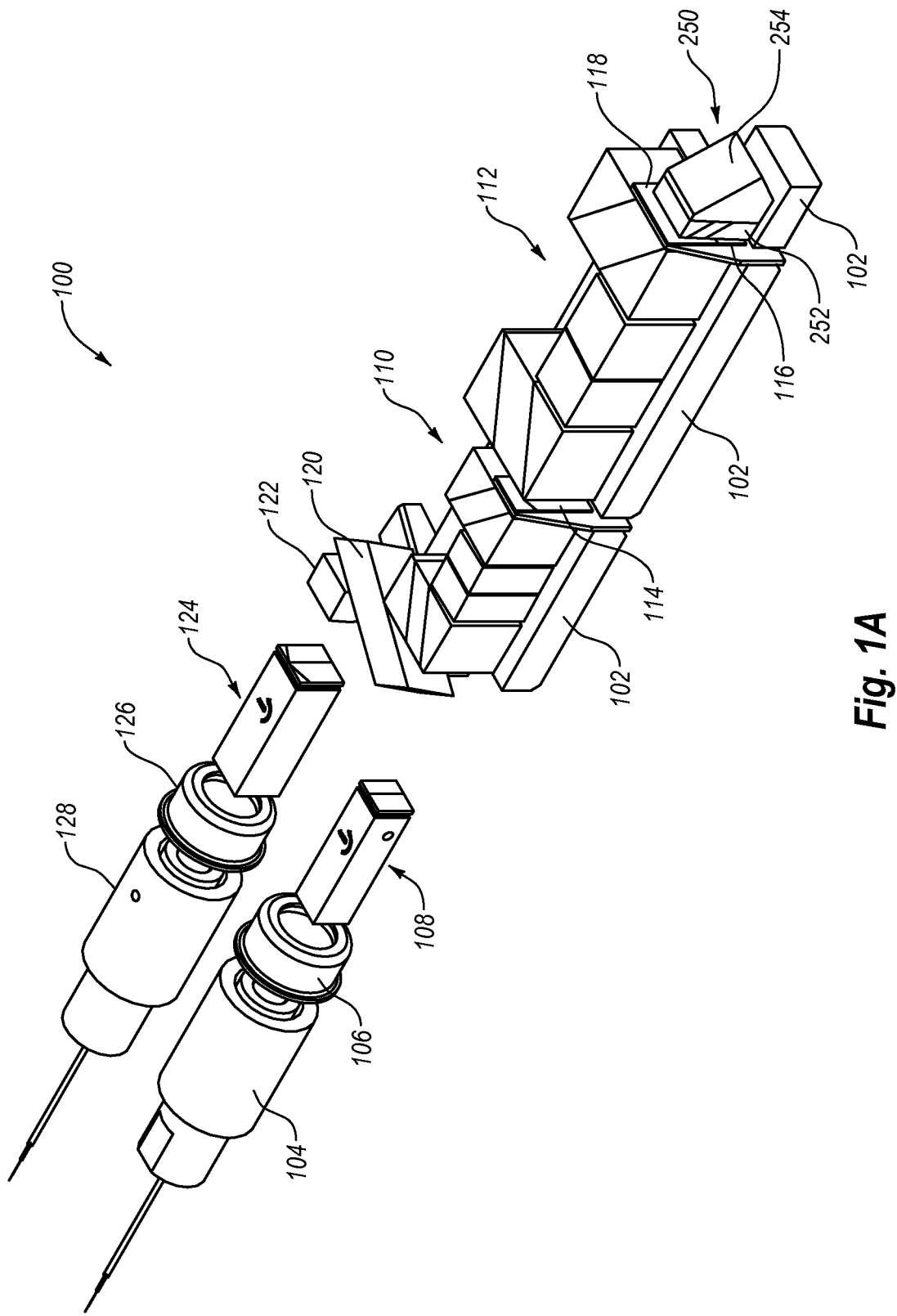
FIG. 1A is a rear perspective view of an example optical deinterleaver having an example polarization beam displacer (PBD)

Reference is first made to FIG. 1A in which an example interleaver 100 is disclosed. The example interleaver 100 is configured to interleave a first optical signal with a second optical signal and configured to deinterleave the first optical signal from the second optical signal. For example, the interleaved optical signal can have 50 GHz channel spacing, while the two deinterleaved optical signals can each have 100 GHz channel spacing.

As disclosed in FIG. 1A, the example interleaver 100 includes bases 102, a single-fiber collimator 104, a window cap 106, a first polarization beam displacing block 108, first and second filter cells 110 and 112 interleaved with a first half-waveplate 114, and a second half-waveplate 116. As disclosed in FIG. 1A, the example interleaver 100 also includes a third half-waveplate 118, a lateral shift prism 120, a roof prism 122, a second polarization beam displacing block 124, a window cap 126, and a dual fiber collimator 128. As disclosed in FIG. 1A, the example interleaver 100 further includes a combined polarization beam displacer 250.

Figure 1B:
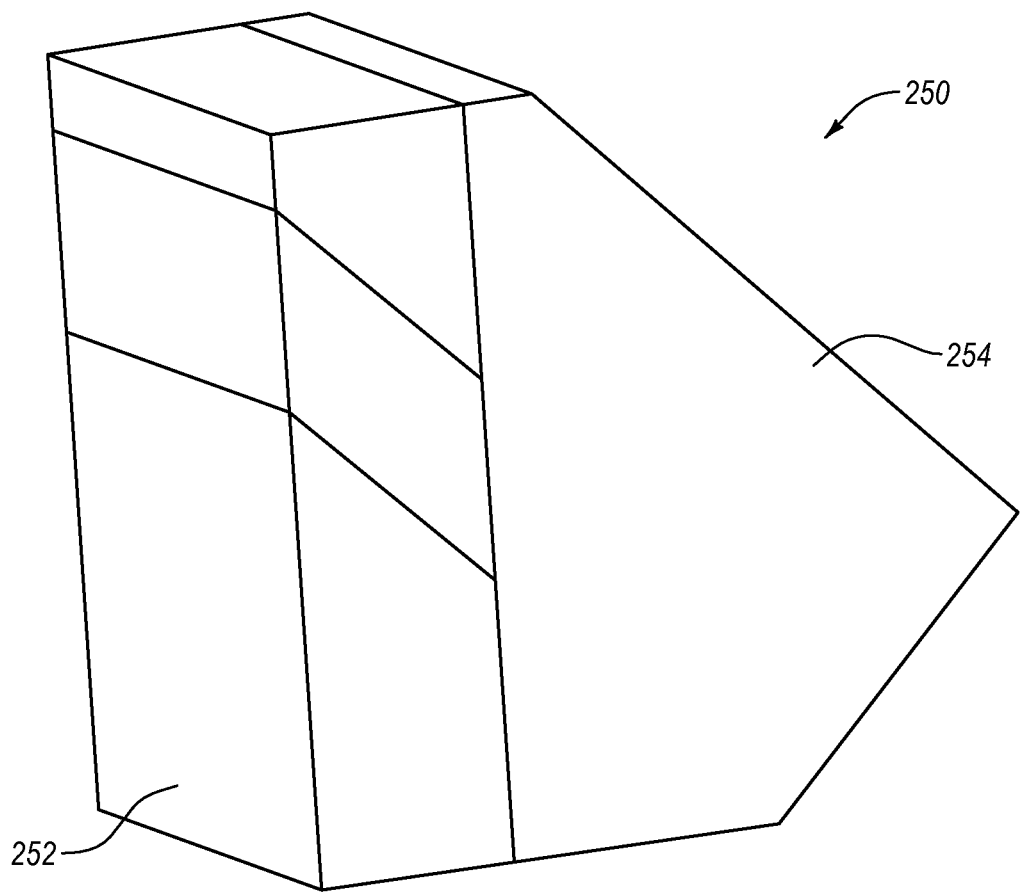
FIG. 1B is a perspective view of the example PBD of FIG. 1A.

As disclosed in FIG. 1B, the polarization beam displacer (PBD) 250 includes a polarization beam splitter (PBS) 252 and a retro-reflector 254. Unlike typical configurations in which the PBS is separated from the retro-reflector by an air gap, the PBS 252 is bonded directly to the retro-reflector 254 without any air gap. This direct bonding can avoid the need to coat the gap-facing sides of the PBS 252 and retro-reflector 254 with an anti-reflective coating, thus decreasing the cost and complexity of the PBS 252 and retro-reflector 254. This direct bonding also enables the retro-reflector 254 to reinforce the PBS 252, thus enabling the PBS 252 to be thinner than a stand-alone PBS, as discussed in greater detail below.

Figure 2:
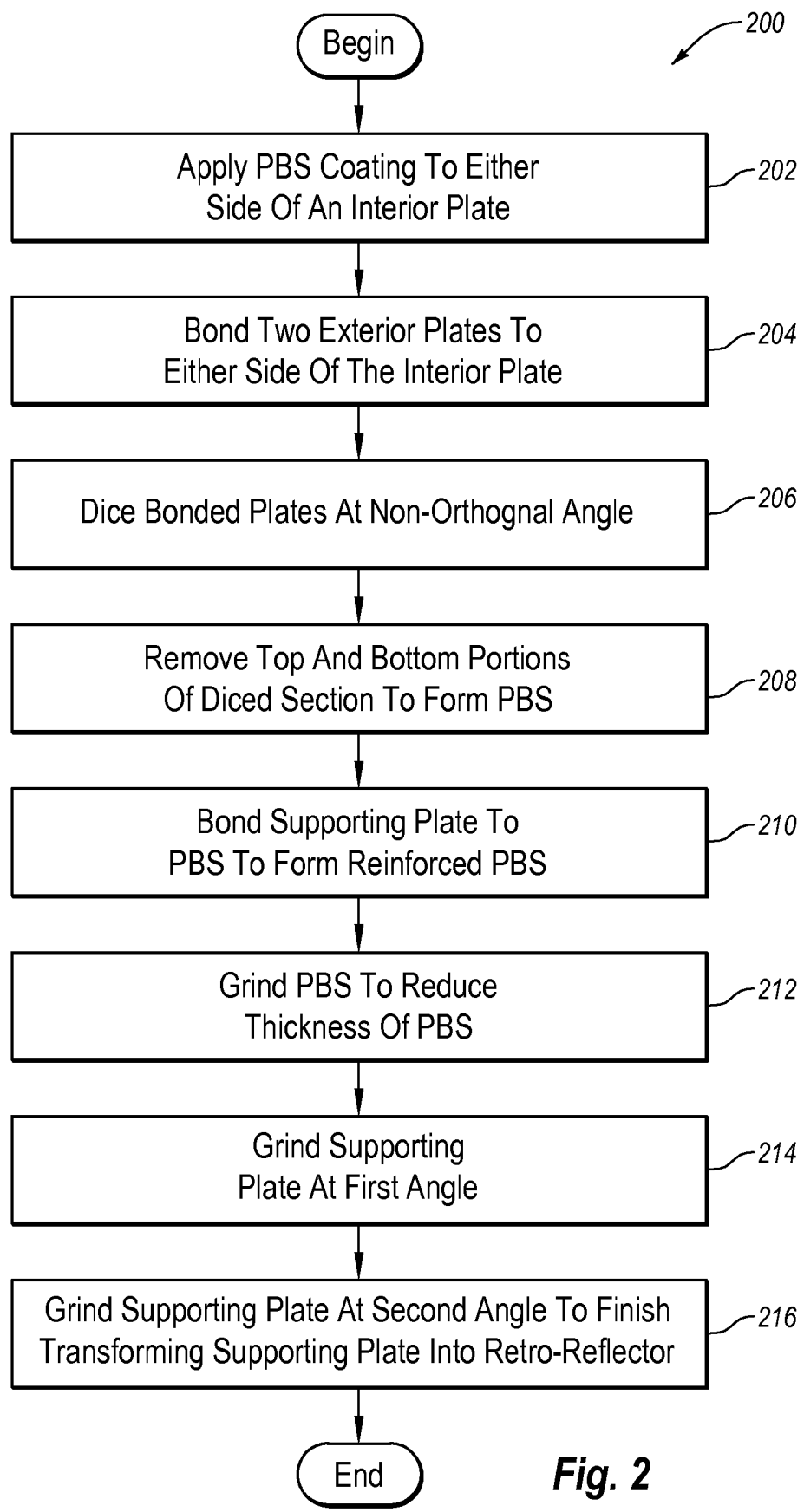
FIG. 2 is a flowchart of an example method for fabricating the PBD of FIGS. 1A and 1B.

With reference now to FIG. 2, an example method 200 for fabricating the PBD 250 is disclosed. The acts of the example method 200 will now be discussed in connections with FIG. 3A-3I.

Figure 3A:
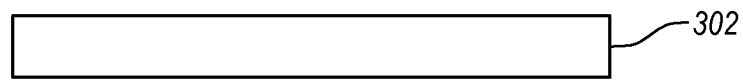
FIGS. 3A-3L are schematic views of various example embodiments of the acts of the example method of FIG. 2.

With reference to FIGS. 2 and 3A, the method 200 begins with an act 202 in which a coating, such as a PBS coating or other coating, is applied to either side of an interior plate 302. The interior plate 302 can be formed from a variety of optically transmissive materials including, but not limited to, silicon, plastics such as unfilled polyetherimide, fused silica, SF11 glass, and other glasses.

Figure 3B:
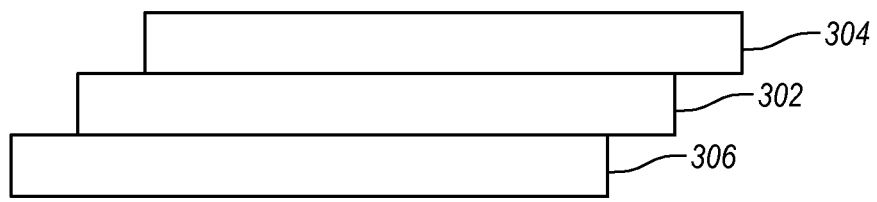

With reference to FIGS. 2 and 3B, the method 200 continues with an act 204 in which two exterior plates 304 and 306 are bonded, using heat and pressure, to either side of the interior plate 302. The exterior plates 304 and 306 can be formed from any of the materials listed above in connection with the interior plate 302. In at least some example embodiments, the exterior plates 304 and 306 are formed from the same material as the interior plate 302. The exterior plates 304 and 306 can be bonded to the interior plate 302 by first polishing the bonding surfaces. Then, the exterior plates 304 and 306 can be pressed against either side of the interior plate 302. Finally, the plates 302, 304, and 306 can be baked in an oven to complete the bonding process. For example, the plates 302, 304, and 306 can be baked in an oven at a temperature that is greater than or equal to 300 degrees Celsius. The baking at the act 204 can enable better molecular diffusion and adhesion between the bonded surfaces.

Figure 3C:
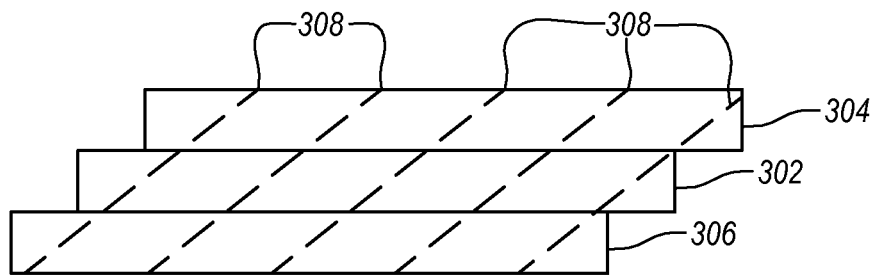
Figure 3D:
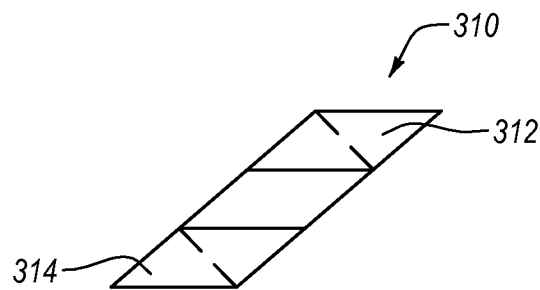

With reference to FIGS. 2, 3C, and 3D, the method 200 continues with an act 206 in which the bonded plates 302-306 are diced at an angle that is not orthogonal to the bonded plates 302-306. For example, the bonded plates 302-306 may be diced along the dotted lines 308, resulting in four diced sections similar to the diced section 310 disclosed in FIG. 3D.

Figure 3E:
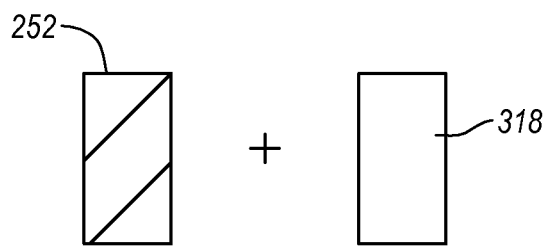

With reference to FIGS. 2, 3D, and 3E, the method 200 continues with an act 208 in which a top portion 312 and a bottom portion 314 of a diced section 310 are removed to complete the formation of a multi-body PBS 252 having a generally rectangular perimeter.

Figure 3F:
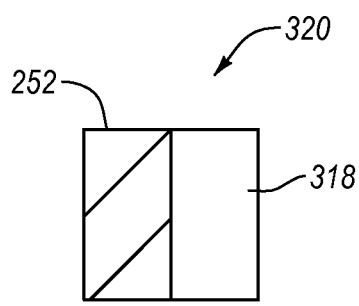

With reference to FIGS. 2, 3E, and 3F, the method 200 continues with an act 210 in which a supporting plate 318 is bonded, using heat and pressure, to the PBS 252 to form a reinforced PBS 320. For example, the PBS 252 can be bonded to the supporting plate 318 using a technique similar to the technique discussed above in connection with the act 204. Also, the supporting plate can be formed from any of the materials listed above in connection with the interior plate 302. For example, the supporting plate 318 can be formed from the same material as the PBS 252. Alternatively, in at least some example embodiments, the material from which the supporting plate 318 is formed can have a coefficient of thermal expansion (CTE) that is within about 0.5 parts per million of the CTE of the material from which the PBS 252 is formed.

Figure 3G:
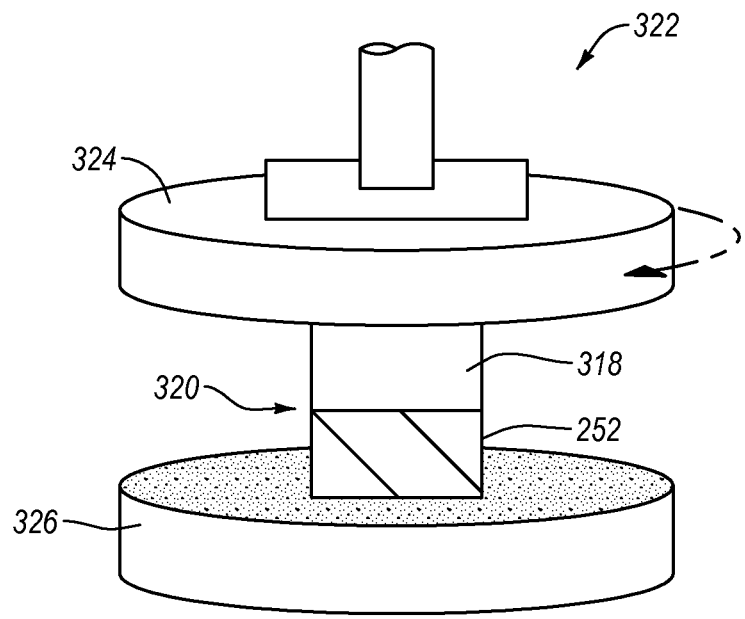
Figure 3H:
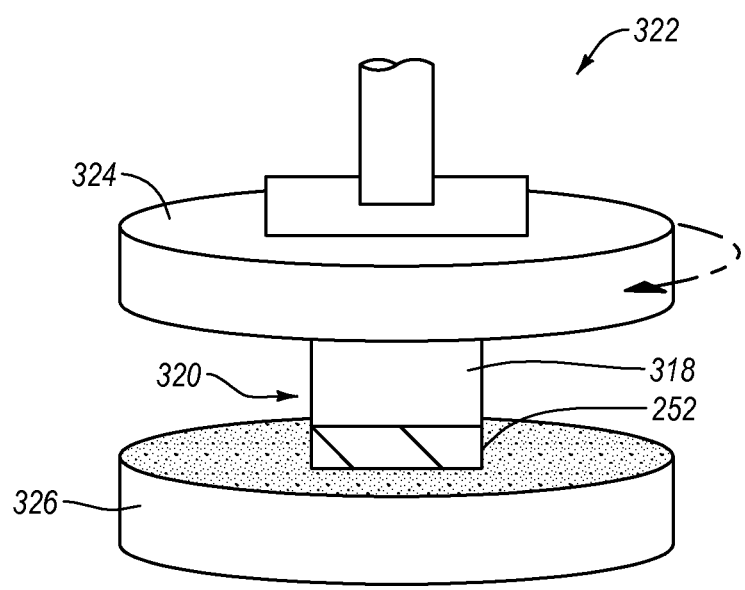

With reference to FIGS. 2, 3G, and 3H, the method 200 continues with an act 212 in which the PBS 252 is ground to reduce the thickness of the PBS 252. As disclosed in FIG. 3G, this grinding can be accomplished using a grinder 322 that includes a mount 324 and a grinding plate 326. The supporting plate 318 of the reinforced PBS 320 can be mounted to the mount 324 and the grinder 322 can then cause the mount 324 and the reinforced PBS 320 to rotate with respect to the grinding plate 326. The friction between the grinding plate 326 and the PBS 252 of the reinforced PBS 320 causes a portion of the PBS 252 to be ground away, resulting in a reduction of the thickness of the PBS 252, as disclosed in FIG. 3H. The thickness of the PBS 252 can be reduced to about 1.0 millimeter or less. For example, the thickness of the PBS 252 can be reduced to about 0.3 millimeters or less. The grinding plate 326 can be a tar polishing plate, for example, although other types of grinding plates are possible and contemplated.

Figure 3I:
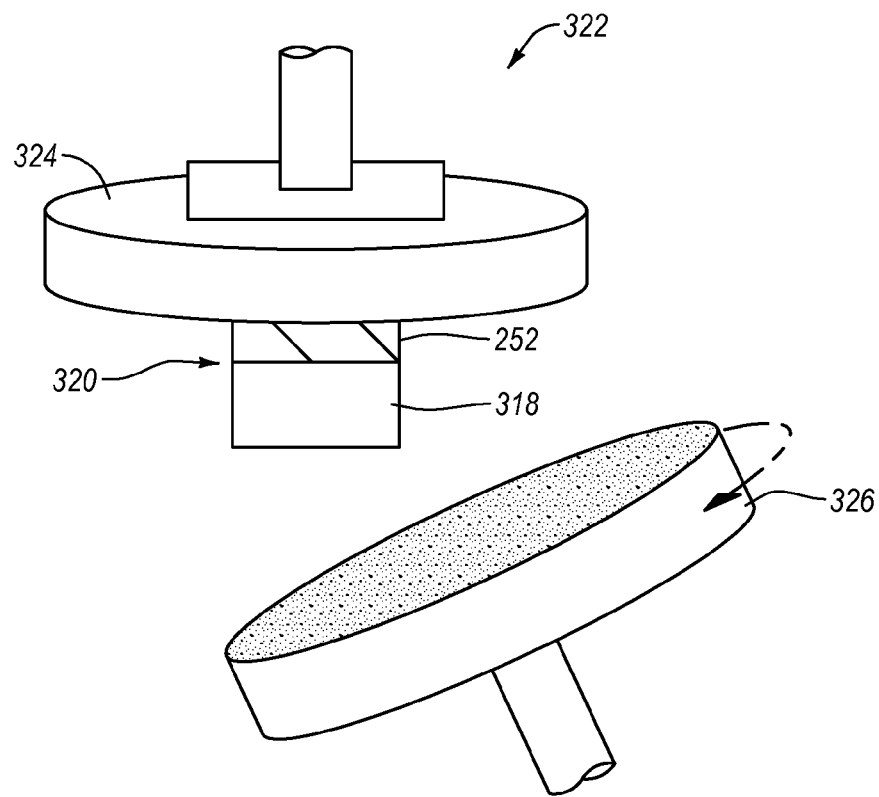
Figure 3J:
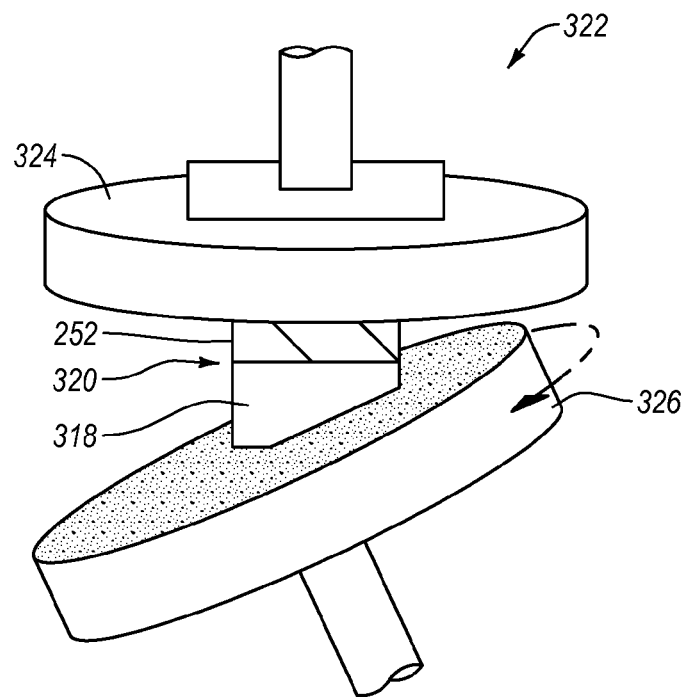

With reference to FIGS. 2, 3I, and 3J, the method 200 continues with an act 214 in which a first portion of the supporting plate 318 is ground at a first angle. As disclosed in FIGS. 3I and 3J, this grinding can be accomplished using the grinder 322. As disclosed in FIG. 3I, the PBS 252 of the reinforced PBS 320 can be mounted to the mount 324 at a first angle to the grinding plate 326. The grinder 322 can then cause the grinding plate 326 to rotate with respect to the mount 324 and the reinforced PBS 320. The friction between the grinding plate 326 and the supporting plate 318 causes a corner of the supporting plate 318 to be ground away, resulting in a first angled surface on the supporting plate 318, as disclosed in FIG. 3J.

Figure 3K:
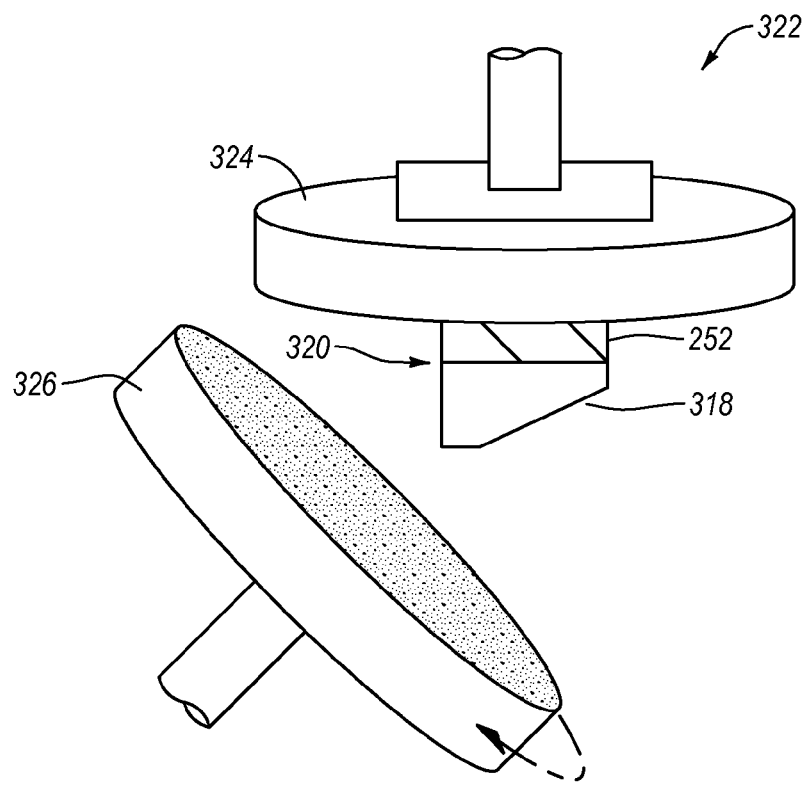
Figure 3L:
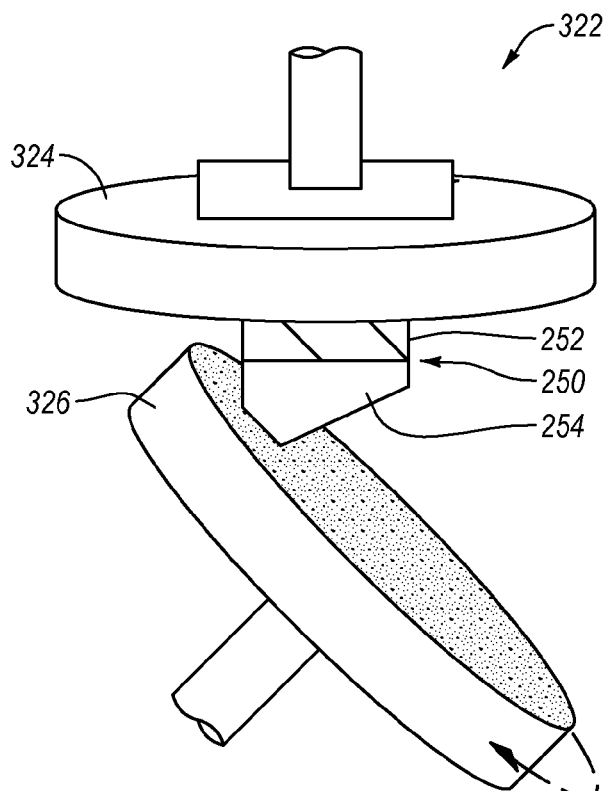

With reference to FIGS. 2, 3K, and 3L, the method 200 continues with an act 216 in which a second portion of the supporting plate 318 is ground at a second angle. As disclosed in FIG. 3K and 3J, this grinding can be accomplished using the grinder 322. As disclosed in FIG. 3K, the PBS 252 of the reinforced PBS 320 can be mounted to the mount 324 at a first angle to the grinding plate 326. The grinder 322 can then cause the grinding plate 326 to rotate with respect to the mount 324 and the reinforced PBS 320. The friction between the grinding plate 326 and the supporting plate 318 causes a second corner of the supporting plate 318 to be ground away, resulting in a second angled surface on the supporting plate 318, as disclosed in FIG. 3L. Thus, the acts 214 and 216 transform the supporting plate 318 into the retro-reflector 254 and transform the reinforced PBS 320 into the PBD 250.

Figures 4, 5:
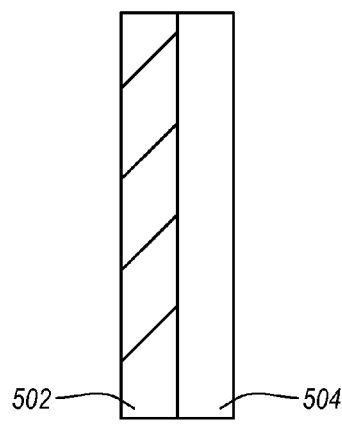
FIG. 4 is a chart comparing various characteristics of a prior art device and the example PBD of FIGS. 1A and 1B that was fabricated according to the example method of FIG. 2.
FIG. 5 is a side view of an example reinforced multi-body PBS array.

With reference to FIG. 4, a chart 400 compares a prior art PBD with the PBD 250. The prior art PBD includes a PBS and a retro-reflector separated by a 2 millimeter gap. As disclosed in the chart 400, the thickness of the PBS in both optical devices is about 1 millimeter and the thickness of the retro-reflector in both optical device is about 3 millimeters. However, the PBS and the retro-reflector of the prior art PBD is separated by a 2 millimeter gap, while the PBS 252 and the retro-reflector 254 of the PBD 250 are not separated by a gap and are instead bonding directly to one another. Accordingly, the overall thickness of the prior art PBD is about 2 millimeters thicker than the overall thickness of the PBD 250.

Further, the bond-facing surfaces of the PBS and the retro-reflector of the prior art PBD are also coated with an anti-reflective coating, while the PBS 252 and the retro-reflector 254 of the PBD 250 include no such anti-reflective coating. Thus, the removal of the anti-reflective coating from the PBD 250 decreases the cost and complexity of manufacturing the PBD 250.

As disclosed in the chart 400, the yield of the PBD 250 is about 90 percent, while the yield of the prior art PBD is only about 20 percent. In addition, the insertion loss of the PBD 250 is about half the insertion loss of the prior art PBD, while the extinction ratio remains about equal between the two optical devices. Thus, the PBD 250 exhibits a dramatic increase in the yield and a dramatic decrease in the insertion loss over the prior art PBD. Further, the PBD 250 can be manufactured with a decreased fabrication complexity and result exhibit less thermal deformation that the prior art PBD.

With reference now to FIG. 5, another type of optical device is disclosed. In particular, FIG. 5 discloses a reinforced polarization beam splitter array (PBS array) 500. The reinforced PBS array 500 includes a PBS array 502 and a supporting plate 504. The PBS array 502 is bonded directly to the supporting plate 504. This direct bonding enables the supporting plate 504 to reinforce the PBS array 502, thus enabling the PBS array 502 to be thinner than a stand-alone PBS array, as discussed in greater detail below. Like the PBS 252 of FIGS. 1A and 1B, the PBS array 502 is a multi-body optical device. However, instead of being formed from only three components, the PBS array 502 is formed from five components.

Figure 6:
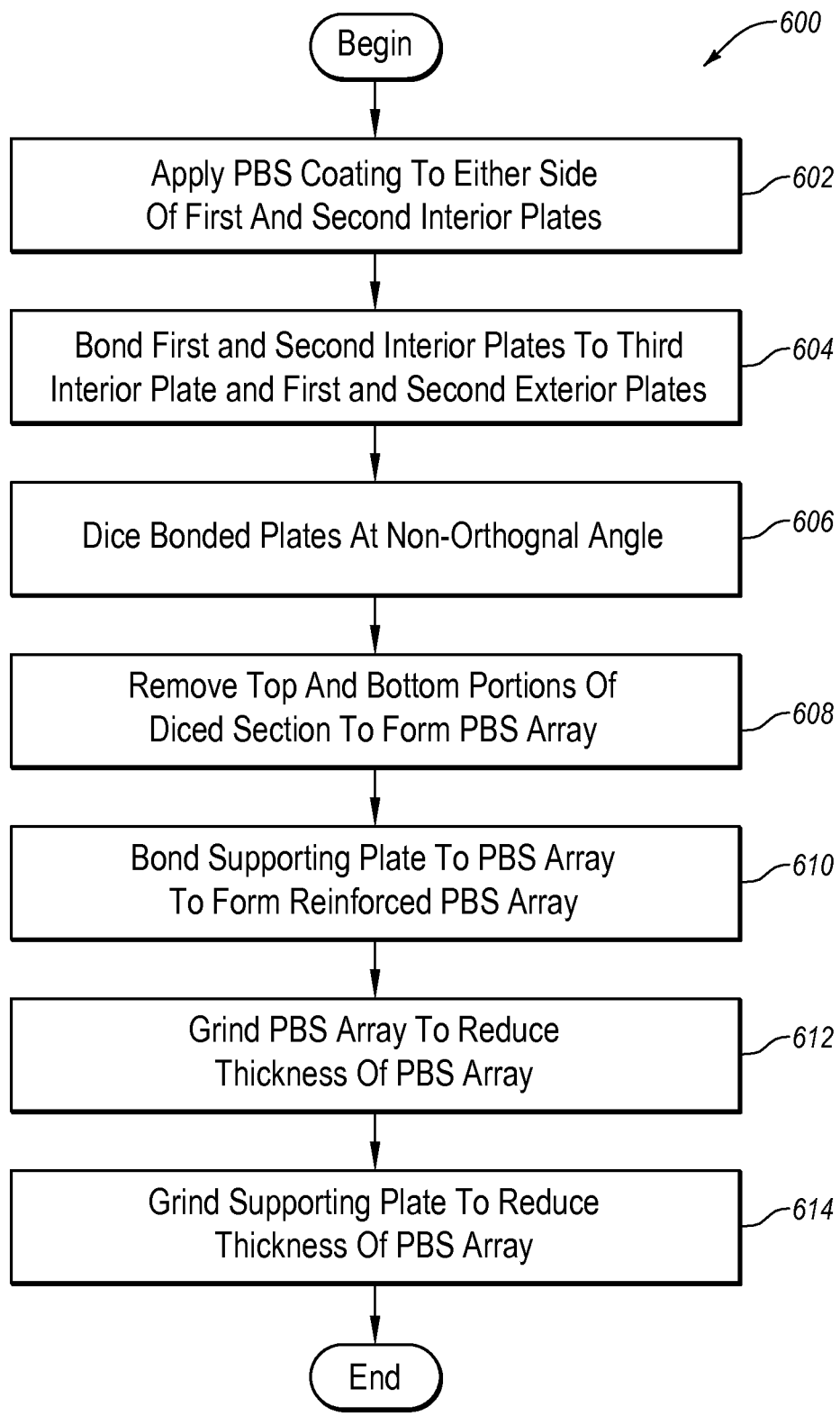
FIG. 6 is a flowchart of an example method for fabricating the reinforced multi-body PBS array of FIG. 5.

With reference now to FIG. 6, an example method 600 for fabricating the reinforced PBS array 500 is disclosed. The acts of the example method 600 will now be discussed in connections with FIG. 7A-7I.

Figure 7A:
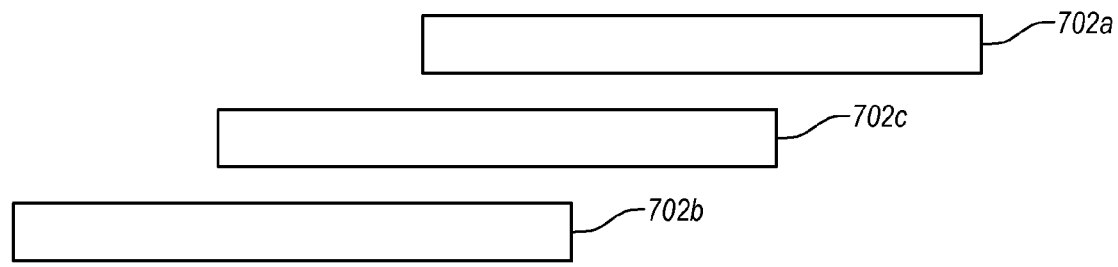
FIGS. 7A-7J are schematic views of various example embodiments of the acts of the example method of FIG. 6.
Figure 7B:

With reference to FIGS. 6 and 7A, the method 600 begins with an act 602 in which a coating, such as a PBS coating or other coating, is applied to either side of first and second interior plates 702a and 702b. The interior plates 702a and 702b can be formed from a variety of optically transmissive materials including, but not limited to, any of the materials listed above in connection with the interior plate 302.

With reference to FIGS. 2 and 3B, the method 200 continues with an act 604 in which the first and second interior plates 702a and 702b are bonded to either side of a third interior plates 702c and two exterior plates 704 and 706 are bonded to the interior plates 702a and 702b, using heat and pressure. The exterior plates 704 and 706 can be formed from any of the materials listed above in connection with the interior plate 302. In at least some example embodiments, the exterior plates 704 and 706 are formed from the same material as the interior plate 702. The plates 704, 702a, 702c, 702b, and 706 can be bonded to one another by polishing the bonding surfaces, pressing the plates against one another, and baking the plates in an oven at a temperature that is greater than or equal to 300 degrees Celsius, for example.

Figure 7C:
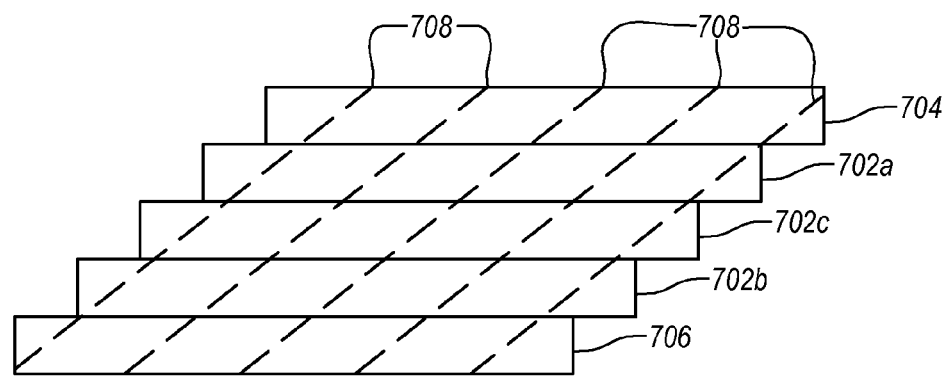
Figure 7D:
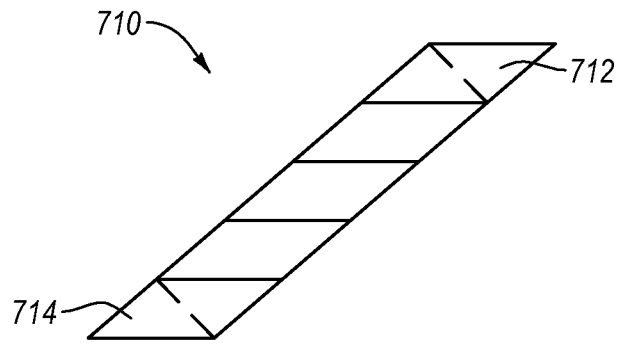

With reference to FIGS. 6, 7C, and 7D, the method 600 continues with an act 606 in which the bonded plates 704, 702a, 702c, 702b, and 706 are diced at an angle that is not orthogonal to the bonded plates. For example, the bonded plates 704, 702a, 702c, 702b, and 706 may be diced along the dotted lines 708, resulting in four diced sections similar to the diced section 710 disclosed in FIG. 7D.

Figure 7E:
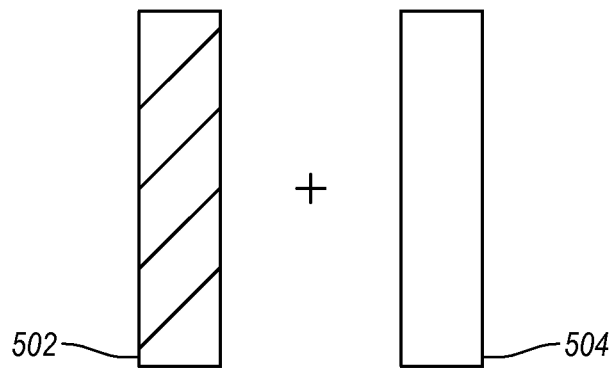

With reference to FIGS. 6, 7D, and 7E, the method 600 continues with an act 608 in which a top portion 712 and a bottom portion 714 of a diced section 710 are removed to complete the formation of a multi-body PBS array 502 having a generally rectangular perimeter.

Figure 7F:
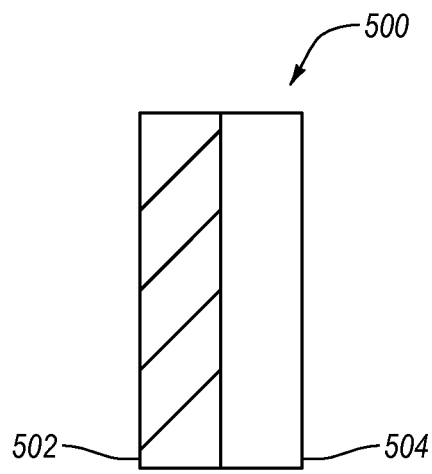

With reference to FIGS. 6, 7E, and 7F, the method 600 continues with an act 610 in which a supporting plate 504 is bonded, using heat and pressure, to the PBS array 502 to form the reinforced PBS array 500. For example, the PBS array 502 can be bonded to the supporting plate 504 using a technique similar to the technique discussed above in connection with the act 604. Also, the supporting plate can be formed from any of the materials listed above in connection with the plates 704, 702a, 702c, 702b, and 706. For example the supporting plate 504 can be formed from the same material as the PBS array 502. Alternatively, in at least some example embodiments, the material from which the supporting plate 504 is formed can have a CTE that is within about 0.5 parts per million of the CTE of the material from which the PBS array 502 is formed.

Figure 7G:
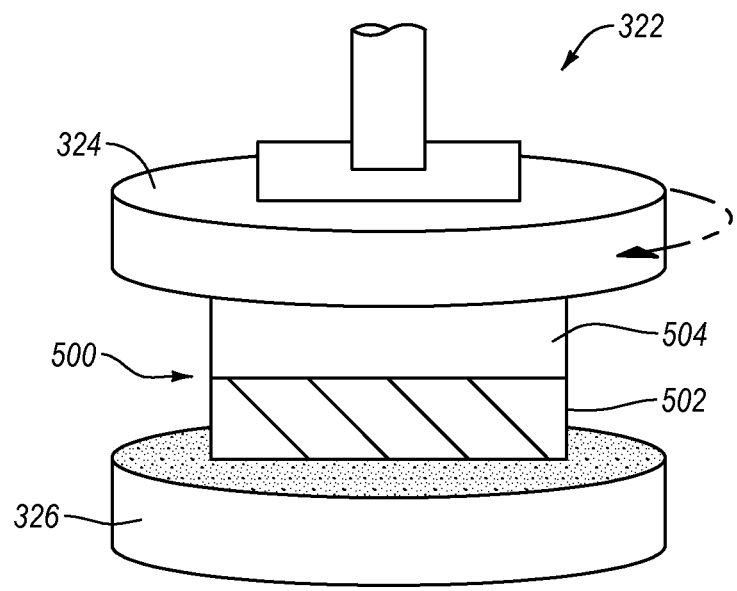
Figure 7H:
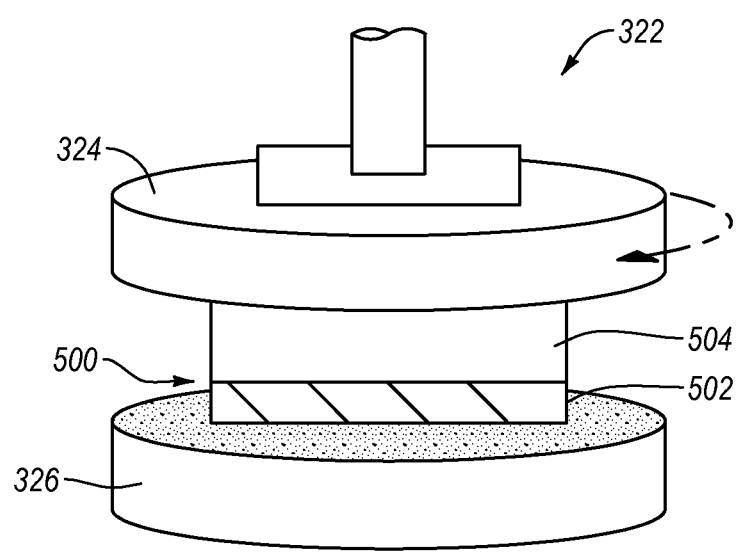

With reference to FIGS. 6, 7G, and 7H, the method 600 continues with an act 612 in which the PBS array 502 is ground to reduce the thickness of the PBS array 502. As disclosed in FIG. 7G, this grinding can be accomplished using the grinder 322, which is discussed above in connection with FIGS. 3A-3L. The supporting plate 504 of the reinforced PBS array 500 can be mounted to the mount 324 and the grinder 322 can then cause the mount 324 and the reinforced PBS array 500 to rotate with respect to the grinding plate 326. The friction between the grinding plate 326 and the PBS array 502 of the reinforced PBS array 500 causes a portion of the PBS array 502 to be ground away, resulting in a reduction of the thickness of the PBS array 502, as disclosed in FIG. 7H. The thickness of the PBS array 502 can be reduced to about 1.0 millimeter or less. For example, the thickness of the PBS array 502 can be reduced to about 0.3 millimeters or less.

Figure 7I:
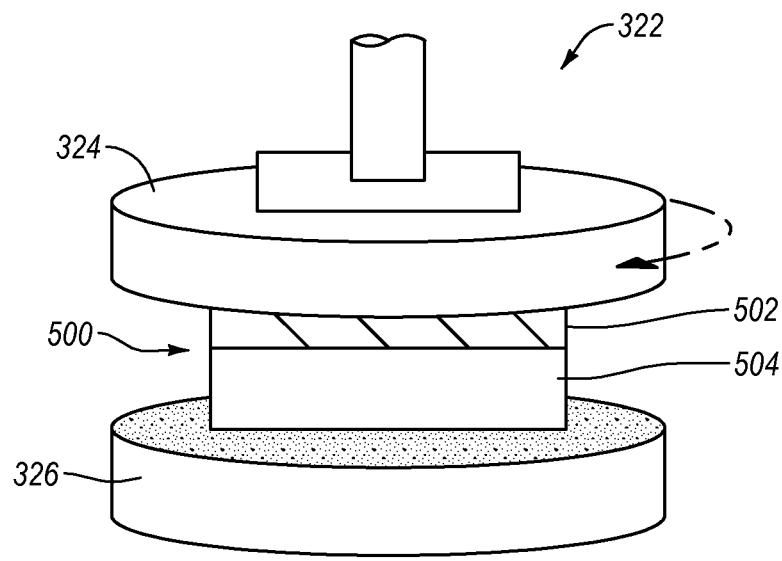
Figure 7J:
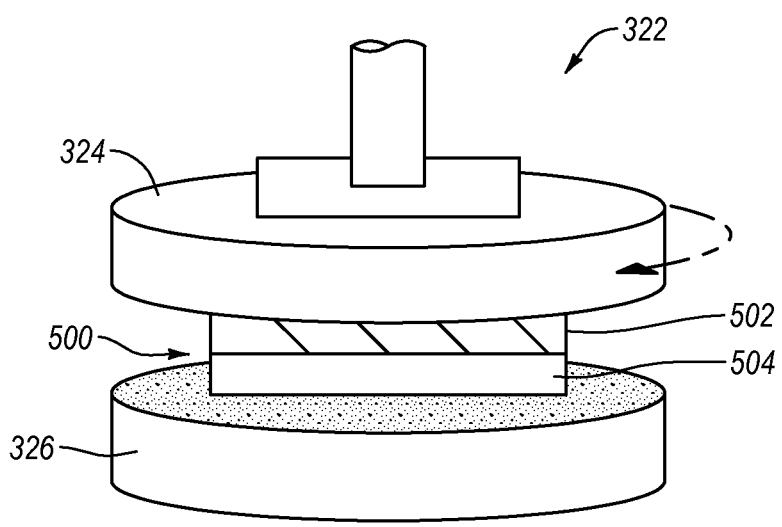

With reference to FIGS. 6, 7I, and 7J, the method 600 continues with an act 614 in which the supporting plate 504 is ground to reduce the thickness of the supporting plate 504. As disclosed in FIG. 7I, this grinding can be accomplished using the grinder 322. The PBS array 502 of the reinforced PBS array 500 can be mounted to the mount 324 and the grinder 322 can then cause the grinding plate 326 to rotate with respect to the mount 324 and the reinforced PBS array 500. The friction between the grinding plate 326 and the supporting plate 504 of the reinforced PBS array 500 causes a portion of the supporting plate 504 to be ground away, resulting in a reduction of the thickness of the supporting plate 504, as disclosed in FIG. 7J. The thickness of the supporting plate 504 can be reduced to about 1.0 millimeter or less. For example, the thickness of the supporting plate 504 can be reduced to about 0.3 millimeters or less.

Similar to the PBD 250, the reinforced multi-body PBS array 500 can be manufactured with a higher yield than prior art PBS arrays. Further, the bonding of the supporting layer 504 to the multi-body PBS array 502 reduces the thermal deformation of the multi-body PBS array 502. The method 600 also decreased the fabrication complexity, the thickness, and the insertion loss of the reinforced multi-body PBS array 500.

The example embodiments disclosed herein may be embodied in other specific forms. The example embodiments disclosed herein are to be considered in all respects only as illustrative and not restrictive.

What is claimed is:

1. A method for fabricating a reinforced multi-body optical device, the method comprising:
   applying a coating to either side of an interior plate;
   a first bonding, using heat and pressure, bonding two plates to either side of the interior plate;
   dicing the bonded plates at an angle that is not orthogonal to the bonded plates;
   removing top and bottom portions of a diced section to form a multi-body polarization beam splitter (PBS) having a generally rectangular perimeter;
   a second bonding, using heat and pressure, bonding a supporting plate to the multi-body PBS to form a reinforced multi-body PBS, wherein the supporting plate has a CTE that is within about 0.5 parts per million of the CTE of the multi-body PBS; and
   grinding the multi-body PBS to reduce the thickness of the multi-body PBS.

2. The method as recited in claim 1, further comprising:
   grinding the supporting plate to reduce the thickness of the supporting plate.

3. The method as recited in claim 2, wherein the thickness of the reinforced multi-body PBS is less than or equal to about 1.0 millimeters.

4. The method as recited in claim 1, further comprising:
   grinding a first portion of the supporting plate a first angle; and
   grinding a second portion of the supporting plate at a second angle, so as to transform the supporting plate into a retro-reflector and transform the reinforced multi-body PBS into a PBD.

5. The method as recited in claim 1, wherein the second bonding comprises:
   polishing a surface of the multi-body PBS;
   polishing a surface of the supporting plate;
   pressing the polished surface of the multi-body PBS against the polished surface of the supporting plate to form the reinforced multi-body PBS; and
   baking the reinforced multi-body PBS in an oven at a temperature that is greater than or equal to about 300° Celsius.

6. The method as recited in claim 1, wherein the grinding comprises grinding the multi-body PBS to reduce the thickness of the multi-body PBS using a tar polishing plate.

* * * * *

UNITED STATES PATENT AND TRADEMARK OFFICE
CERTIFICATE OF CORRECTION

PATENT NO.         : 9,097,908 B2  
APPLICATION NO.    : 14/557244  
DATED              : August 4, 2015  
INVENTOR(S)        : Chen et al.

Page 1 of 1

It is certified that error appears in the above-identified patent and that said Letters Patent is hereby corrected as shown below:

Specification

In Column 1, Line 8, delete "2010," and insert -- 2010, now Pat. No. 8,903,206, --, therefor.

In Column 6, Lines 65-66, delete "layer 504" and insert -- plate 504 --, therefor.

Claims

In Column 8, Line 8, in Claim 4, delete "plate a" and insert -- plate at a --, therefor.

Signed and Sealed this
Fifth Day of July, 2016

Michelle K. Lee
*Director of the United States Patent and Trademark Office*